US012320165B2

(12) United States Patent
O'Brien

(10) Patent No.: US 12,320,165 B2
(45) Date of Patent: Jun. 3, 2025

(54) APPARATUS AND METHOD TO RESTRAIN AND POSITION AN INDIVIDUAL(S) FOR HANDCUFFING

(71) Applicant: Reddog Properties, LLC, Fairview, OK (US)

(72) Inventor: Michael P. O'Brien, Fairview, OK (US)

(73) Assignee: Reddog Properties, LLC, Fairview, OK (US)

(*) Notice: Subject to any disclaimer, the term of this patent is extended or adjusted under 35 U.S.C. 154(b) by 0 days.

(21) Appl. No.: 18/295,098

(22) Filed: Apr. 3, 2023

(65) Prior Publication Data

US 2023/0323707 A1 Oct. 12, 2023

Related U.S. Application Data

(60) Provisional application No. 63/328,807, filed on Apr. 8, 2022.

(51) Int. Cl.
*E05B 75/00* (2006.01)

(52) U.S. Cl.
CPC .................................... *E05B 75/00* (2013.01)

(58) Field of Classification Search
CPC .......... E05B 75/00; Y10T 70/404; A61F 5/37; A62B 35/00
USPC ............................................................ 70/16
See application file for complete search history.

(56) References Cited

U.S. PATENT DOCUMENTS 4,024,736 A * 5/1977 De Michieli ........... E05B 75/00 70/16
4,245,840 A * 1/1981 Van Housen ...... A63B 21/0552 482/122
4,529,240 A * 7/1985 Engel ..................... A22B 7/006 452/187
5,345,947 A * 9/1994 Fisher ................... A61F 5/3715 128/878
5,351,367 A * 10/1994 Kennedy ............... B60P 7/0823 24/129 R
5,443,155 A * 8/1995 Robinson ................ E05B 75/00 206/223
5,581,853 A * 12/1996 Miller ................... A61F 5/3761 24/302
6,026,661 A 2/2000 Spiropoulos
6,629,912 B2 * 10/2003 Downs ............... A63B 21/0552 482/124

(Continued)

OTHER PUBLICATIONS

International Search Report and the Written Opinion for PCT/US23/65284 mailed Jul. 21, 2003.

(Continued)

*Primary Examiner* — Suzanne L Barrett
(74) *Attorney, Agent, or Firm* — DUNLAP CODDING, P.C.

(57) ABSTRACT

An apparatus and a method of constructing an apparatus are disclosed including a plurality of wristlets, a plurality of handles, a plurality of lines constructed of flexible material and attached to the plurality of wristlets at a first end and attached to the plurality of handles at a second end, and at least one tightening member movably attached to the plurality of lines wherein displacing at least one of the plurality of handles away from each other and with respect to the at least one tightening member moves the plurality of wristlets closer together.

12 Claims, 6 Drawing Sheets

(56) References Cited

U.S. PATENT DOCUMENTS

| | | | | |
|---|---|---|---|---|
| 7,210,317 | B2 | 5/2007 | Beane et a | |
| 8,016,335 | B2 * | 9/2011 | McKay | A62B 35/0006 294/152 |
| 8,087,195 | B2 * | 1/2012 | Minges | A01M 31/02 248/230.8 |
| 8,876,675 | B2 * | 11/2014 | Califano | A63B 21/4015 482/121 |
| 2006/0289017 | A1 | 12/2006 | Schmeltz | |
| 2012/0085135 | A1 | 4/2012 | Louden | |
| 2012/0222457 | A1 * | 9/2012 | Kriesel | E05B 75/00 70/16 |
| 2014/0274602 | A1 | 9/2014 | Autogue | |
| 2016/0298365 | A1 | 10/2016 | Christensen | |
| 2020/0308879 | A1 | 10/2020 | Rak | |
| 2021/0404223 | A1 | 12/2021 | Bryan | |

OTHER PUBLICATIONS

United States Trademark Office, SpiderCuff Trademark, Registration date Jul. 24, 2018.

SpiderCuff®—The 21st Century Handcuff, https://www.spidercuff.com/.

* cited by examiner

APPARATUS AND METHOD TO RESTRAIN AND POSITION AN INDIVIDUAL(S) FOR HANDCUFFING

REFERENCE TO RELATED APPLICATIONS

The present patent application claims priority to U.S. Ser. No. 63/328,807 filed on Apr. 8, 2022, the entire content of which is hereby incorporated herein by reference.

BACKGROUND ART

Law enforcement officers frequently endeavor to successfully use handcuffs to restrain an individual(s). Currently conventional handcuffs generally only include a pair of wristlets connected by a short link chain or hinge and range from easy to failed efforts to apply. Individuals are handcuffed in a variety of different conditions and environments, each one presenting its own challenges and dangers for bodily injury, serious bodily injury, death and damage/destruction to property. For example, each time an officer(s) endeavors to arrest an individual(s) using handcuffs, the officer(s) are trained to place the first handcuff on one of the individual's wrists and then hold the individual(s) still enough and long enough to get the other handcuff on the individual's other wrist. In active resisting arrests this can create a period of time during every active resistant arrest encounter when the officer is at a much higher risk than when there is no resistance, or the resistance is passive. For example, an individual(s) with only one handcuff placed upon them may then attempt to use the uncuffed portion as a weapon to use against the officer. A handcuff that is not closed and locked is a dangerous weapon to an officer(s) as the ratchet bar element of the cuff can then become a shard of sorts. Access to such a now dangerous weapon may, and often does, change the non-compliant/active resistor individual(s) into an aggressive/very aggressive and potentially dangerous/very dangerous individual(s) before the officer(s) regain control over the now armed individual(s) acting with a deadly weapon against the officer(s). Moreover, an individual(s) to be handcuffed is simply able to overcome a law enforcement officer's ability, for a variety of reasons, to place handcuffs upon the individual(s). This increases the risk of both the officer(s) and the individual(s) being exposed/overexposed to resulting dangers for bodily injury, serious bodily injury, death and damage/destruction to property.

To this end, a need exists for an apparatus which provides officers with the ability to restrain/position an individual(s) for handcuffing with a reduced risk of harm to all parties. It is to such an apparatus that the inventive concepts disclosed herein are directed.

SUMMARY OF THE INVENTION

The inventive concepts disclosed are generally directed to an apparatus comprising: a first wristlet positionable about a first body part, a second wristlet positionable about a second body part, a first handle, a second handle, a first line constructed of a first flexible material, a second line constructed of a second flexible material, and at least one tightening member. The first flexible material has a first end, a second end, a first width, a first length, and a first cross-sectional dimension extending across the first width. The first length extends between the first end and the second end. The first flexible material is attached to the first wristlet at a first location, and the first flexible material is attached to the first handle at a second location. The first location is spaced a distance apart from the second location. The second flexible material has a third end, a fourth end, a second width, a second length, and a second cross-sectional dimension extending across the second width. The second length extends between the third end and the fourth end. The second flexible material is attached to the second wristlet at a third location, and the second flexible material is attached to the second handle at a fourth location. The third location is spaced a distance apart from the fourth location. The at least one tightening member defines at least one channel. The first line and the second line pass through the at least one channel. The at least one channel has at least one third cross-sectional dimension greater than the first cross-sectional dimension and the second cross-sectional dimension such that the first line and the second line are movable along the first length and the second length within the at least one channel. Displacing at least one of the first handle and/or the second handle with respect to the at least one tightening member varies a distance between the first wristlet and the second wristlet.

Additionally, the inventive concepts disclosed are directed to the apparatus comprising: a plurality of wristlets positionable about a plurality of body parts, a plurality of handles, a plurality of lines, and at least one tightening member. Each of the plurality of wristlets is positioned a first distance from one another. Each of the plurality of lines has a first end and a second end. The first end is attachable to at least one of the plurality of wristlets, and the second end is attachable to at least one of the plurality of handles. The at least one tightening member is movably attached to the plurality of lines. Displacing at least one of the plurality of handles with respect to the at least one tightening member causes at least one of the plurality of wristlets to be positioned a second distance from at least one other wristlet of the plurality of wristlets.

Further, the inventive concepts disclosed are directed to a method of making an apparatus comprising, in any order: attaching a first wristlet to a first section of a first line and a second wristlet to a second section of a second line, the first line and the second line constructed of a flexible material; passing the first line and the second line through at least one channel of a tightening member having a first side and a second side; and attaching a first handle to a third section of the first line and the second handle to a fourth section of the second line; and wherein the first section and the second section are positioned on the first side of the tightening member, and the third section and the fourth section are positioned on the second side of the tightening member.

DETAILED DESCRIPTION

Figure 1:
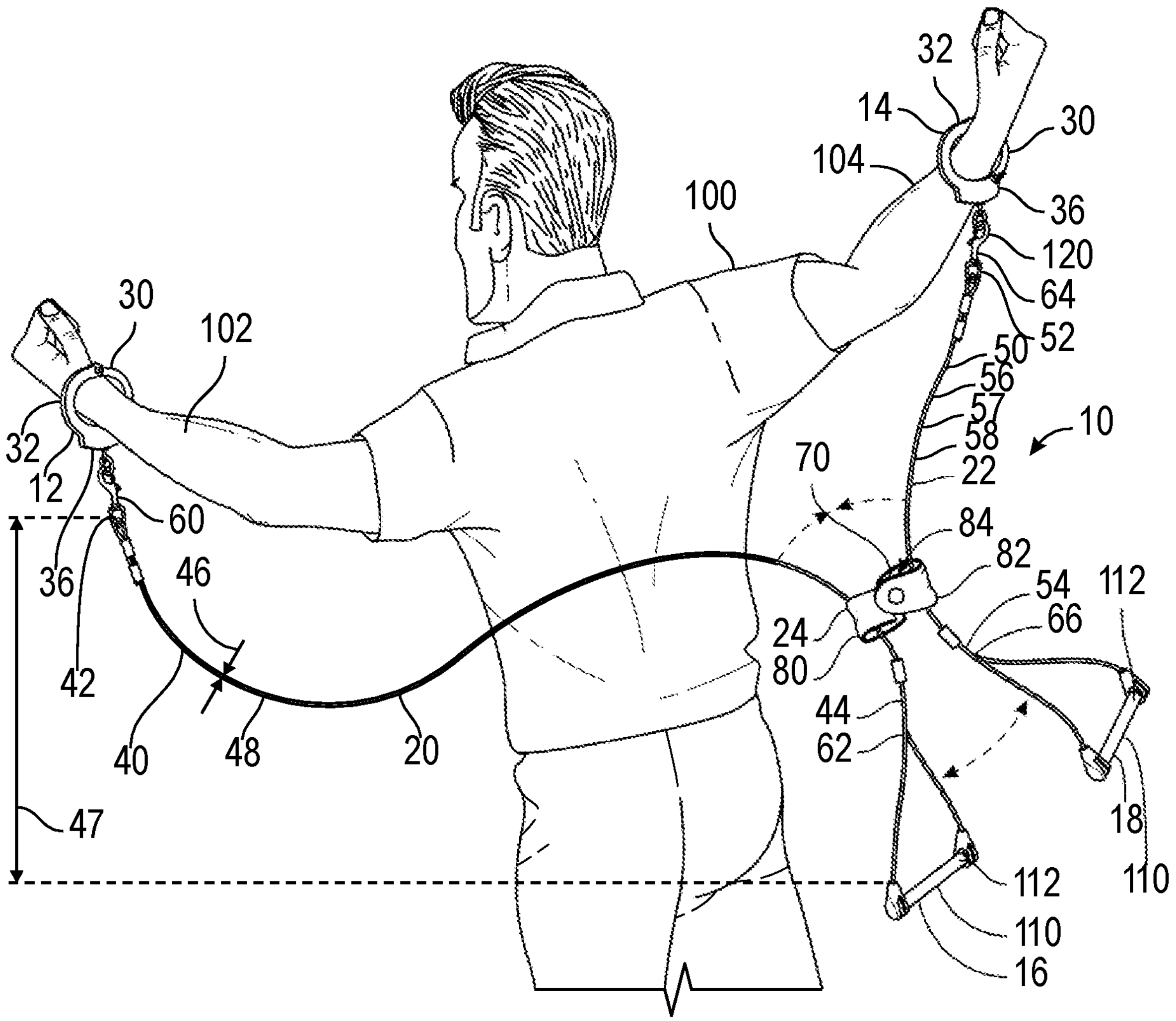
FIG. 1 is a perspective view of one embodiment of an apparatus constructed in accordance with the inventive concepts disclosed herein being applied to an individual's wrists to restrain the individual(s).

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. The inventive concepts disclosed herein are capable of other embodiments, or of being practiced or carried out in various ways. Also, it is to be understood that the phraseology and terminology employed herein is for the purpose of description and should not be regarded as limiting the inventive concepts disclosed and claimed herein in any way.

In the following detailed description of embodiments of the inventive concepts, numerous specific details are set forth to provide a more thorough understanding of the inventive concepts. However, it will be apparent to one of ordinary skill in the art that the inventive concepts within the instant disclosure may be practiced without these specific details. In other instances, well-known features have not been described in detail to avoid unnecessarily complicating the instant disclosure.

As used herein, the terms "comprises," "comprising," "includes," "including," "has," "having," and any variations thereof, are intended to cover a non-exclusive inclusion. For example, a process, method, article, or apparatus that comprises a list of elements is not necessarily limited to only those elements and may include other elements not expressly listed or inherently present therein.

Unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B is true (or present).

In addition, use of the "a" or "an" are employed to describe elements and components of the embodiments disclosed herein. This is done merely for convenience and to give a general sense of the inventive concepts. This description should be read to include one or at least one and the singular also includes the plural unless it is obvious that it is meant otherwise.

As used herein, qualifiers like "substantially," "about," "approximately," and combinations and variations thereof, are intended to include not only the exact amount or value that they qualify, but also some slight deviations therefrom, which may be due to manufacturing tolerances, measurement error, wear and tear, stresses exerted on various parts, and combinations thereof, for example.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Finally, ranges specified herein include the end values as well as a range of two of the values specified. Thus, a range of 1-100 also includes a range of from 1 to 5, 10 to 20, etc.

Figure 2:
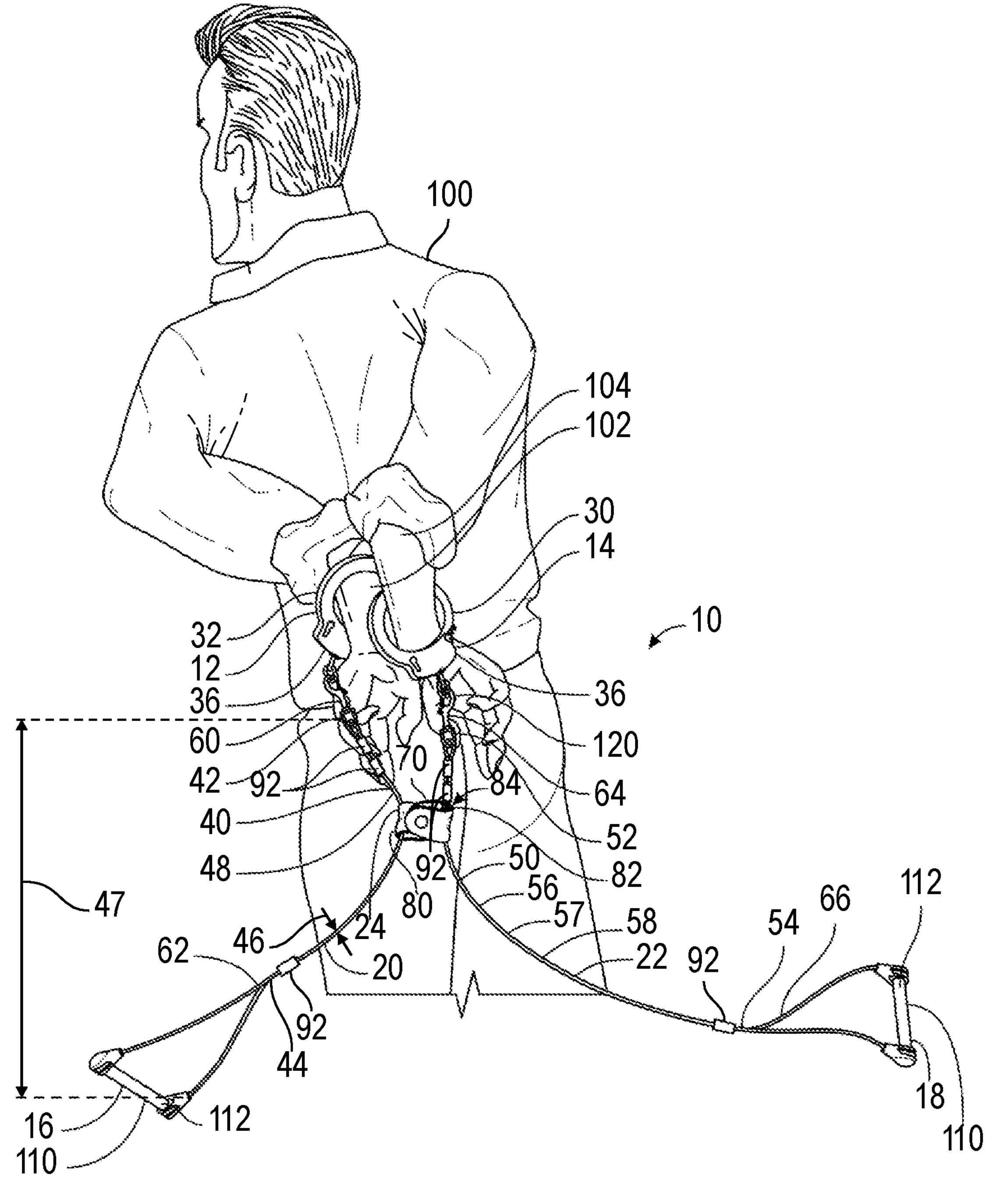
FIG. 2 is a perspective view of the apparatus having handles moved away from a tightening member of the apparatus to bring wristlets of the apparatus attached to the individual's wrists together so that a pair of handcuffs can be applied to the individual's wrists.

Referring now to the drawings, and in particular to FIGS. 1-3, one embodiment of the apparatus 10 is shown comprising a first wristlet 12 and a second wristlet 14, a first handle 16 and a second handle 18, a first line 20 and a second line 22, and at least one tightening member 24. In one embodiment, displacing at least one of the first handle 16 and the second handle 18 with respect to the at least one tightening member 24 varies a distance between the first wristlet 12 and the second wristlet 14 to assist in restraining an individual(s) 100 and/or bringing the individual's 100 wrists together so that a separate handcuff can be applied to the individual's 100 wrists before removing the first wristlet 12 and the second wristlet 14 from the individual's 100 wrists.

The first wristlet 12 is positionable about a first body part 102 of the individual(s) 100. The second wristlet 14 is positionable about a second body part 104 of the individual (s) 100. In one embodiment, the first wristlet 12 and the second wristlet 14 are constructed to be positionable on the portions of the individual's body commonly used for restraint devices known in the art, such as wrists and ankles. The first body part 102 and the second body part 104 will be described herein as wrists.

The first wristlet 12 and the second wristlet 14 may be of similar construction. For example, in one embodiment, the first wristlet 12 and the second wristlet 14 may include a ratchet bar 30 pivotally connected to a double strand wristlet body 32 having internal teeth 34 (see FIGS. 3A-3B) which permit rotation of the ratchet bar 30 only inwardly therethrough but prevent withdrawal in the opposite direction. The first wristlet 12 and the second wristlet 14 may further include an enlarged body portion 36 in which a first lock (not shown) for lockingly engaging the ratchet bar 30 and a second lock (not shown) for fixing the circumference of the first or second wristlet 12, 14 are housed. The wristlets 12 and 14 may be constructed of a material having sufficient strength to restrain the individual(s). The construction and use of wristlets used for restraining an individual(s) is well known in the art. Thus, no further comments with respect to the construction and use of the wristlets 12 and 14 are deemed necessary herein to teach the person of ordinary skill in the art how to make and use the wristlets 12 and 14. In some embodiments, the wristlets 12 and 14 have been honed/smoothed via "metal tumbling" to help eliminate any sharp edges on the wristlet(s) 12, 14 so that in the application of the apparatus 10; the inside edges of the wristlet(s) 12, 14 would not cause undue harm to the area that the wristlet(s) 12, 14 may be applied once honed/smoothed).

However, it is well known and understood by those with skill in the art that minor variations of the disclosed handcuff wristlets exist. It is further understood that the first wristlet 12 and the second wristlet 14 may be made from a variety of materials including, but not limited to, metal, plastic, composite, or a combination thereof, so the first wristlet 12 and the second wristlet 14 are impact resistant, light weight, and corrosive resistant. As shown in FIG. 1, the first wristlet 12 is positioned on the first body part 102 and the second wristlet 14 is positioned on the second body part 104.

Moreover, it will be understood that the present disclosure is not limited by the number of wristlets positionable around body parts 102 and 104. For example, in one embodiment, the apparatus 10 may include a third wristlet (not shown) and/or a fourth wristlet (not shown), where each one of the first wristlet 12, the second wristlet 14, the third wristlet, and the fourth wristlet may be placed on a separate body part, such as an arm or a leg, of the individual(s) 100. For example, the first wristlet 12 may be positioned on one of the individual's 100 wrists, the second wristlet 14 can be positioned on another one of the individual's 100 wrists, the third wristlet can be positioned on one of the individual's 100 ankles, and the fourth wristlet can be positioned on another one of the individual's 100 ankles.

In the embodiment shown in FIG. 1, the apparatus 10 also includes the first handle 16 and the second handle 18. The first and second handles 16, 18 may be constructed to be gripped by at least one individual(s) (not shown) and may be a variety of configurations. It will be understood that the present disclosure may not be limited by the configurations of the handles unless such configuration is specifically required in a claim included below. It will be further understood that the present disclosure may not be limited to any number of handles. For example, in one embodiment, the apparatus 10 may include a third handle (not shown) and a fourth handle (not shown). In one embodiment, the first handle 16 and the second handle 18 may each have a length 110 and a width 112. In some embodiments, the length 110 of the first and second handles 16, 18 may be between four and twelve inches and the width 112 of the first and second handles 16, 18 may be between ¼ inch and two inches so as to provide adequate surface area for gripping by an individual(s).

The handles may be constructed from a variety of materials including, but not limited to, metal, wood, plastic, or a combination thereof, so that the first and second handles 16, 18 are impact resistant, light weight, and corrosive resistant. In one embodiment, the first and second handles 16, 18 may be constructed to be rigid and/or able to withstand the force placed thereon.

In one embodiment, the apparatus 10 includes the first line 20 constructed of a first flexible material 40 and the second line 22 constructed of a second flexible material 50. The first flexible material 40 may have a first end 42, a second end 44, a first width 46, a first length 47, and first cross-sectional dimension 48 extending across the first width 46. The first length 47 may extend between the first end 42 and the second end 44. The second flexible material 50 may have a third end 52, a fourth end 54, a second width 56, a second length 57, and a second cross-sectional dimension 58 extending across the second width 56. The second length 57 may extend between the third end 52 and the fourth end 54. It will be understood that the inventive concepts disclosed herein are not limited to any number of lines, and that the lines may be constructed of more than one flexible material. For example, one embodiment may have a third line (not shown) and/or a fourth line (not shown). In some embodiments, the first cross-sectional dimension 48 is uniform between the first end 42 and the second end 44, and the second cross-sectional dimension 58 is uniform between the third end 52 and the fourth end 54. In other embodiments, the first cross-sectional dimension 48 is not uniform between the first end 42 and the second end 44. For example, the first cross-sectional dimension 48 may be enlarged to engage and stop the at least one tightening member 24 from passing onto certain portions of the first line 20. The second line 22 may be constructed similarly as the first line 20.

It will be understood that the first flexible material 40 and the second flexible material 50 may be constructed of any flexible material, including metal, plastic, composite, or any combination thereof. For example, in some embodiments, the first and second flexible materials 40, 50 may be constructed of rope, cable, string, chord, and/or wire.

In some embodiments, the first and second flexible materials 40, 50 can be formed into a circle having a diameter within a range of between ⅛ inch to about 12 inches and then straightened without damaging the first and second flexible materials 40, 50. The first and second lengths 47, 57 of the first and second lines 20, 22 are greater than the first and second widths 46, 56. In some embodiments, a ratio of the first length 47 to the first width 46 is in a range of 72-6000. Similarly, a ratio of the second length 57 to the second width 56 is in a range of 72-6000. In some embodiments, the first length 47 and the second length 57 may be between three and fifteen feet, and more preferably between 3 feet and 5 feet. In some embodiments, the first width 46 and the second width 56 are in a range from 1/32 of an inch to ½ of an inch.

The first flexible material 40 and the second flexible material 50 may be constructed of the same or different flexible material. In one embodiment, the first flexible material 40 and the second flexible material 50 may be constructed to have a tensile rating between 150 and 300 lbf. In another embodiment, the first flexible material 40 and the second flexible material 50 may be constructed of stronger material having a tensile rating between 300 and 1000 lbf. Some conventional handcuffs are required by local laws/law enforcement agencies policies and procedures mandates to be capable of withstanding 495 lbf for at least thirty seconds. In one embodiment, the first flexible material 40 and the second flexible material 50 are constructed to be capable of withstanding 495 lbf for at least thirty seconds. However, it will be understood that the present inventive concepts are not limited by the lower and upper bounds of the tensile strengths of the first flexible material 40 and the second flexible material 50.

It will be further understood that the first flexible material 40 and the second flexible material 50 are not limited to the number of ends. Moreover, the flexibility of the first flexible material 40 and the second flexible material 50 may allow for a variety of widths, lengths, or cross-sectional dimensions. In one embodiment, the flexibility may also allow for the first flexible material 40 and the second flexible material 50 to have a variety of widths and/or cross-sectional dimensions about the first length 47 and the second length 57 respectively. In one embodiment, the first line 20 and the second line 22 may include at least one mechanism (not shown) for retracting the first flexible material 40 or the second flexible material 50, thereby varying the first length 47 or the second length 57. In the embodiments shown in FIGS. 1-3, however, the first line 20 and the second line 22 have a fixed length and uniform cross-section.

The first flexible material 40 and the second flexible material 50 may not be limited by shape or size and may be constructed in a variety of shapes and sizes. For example, the first and second cross-sectional dimensions 48, 58 may have a circular or polygonal shape. It will be understood that the first flexible material 40 and the second flexible material 50 may be constructed to be the same or different shape and size.

The first flexible material 40 may be attached to the first wristlet 12 at a first location 60 and the first flexible material 40 may be attached to the first handle 16 at a second location 62. The first location 60 may be spaced a distance apart from the second location 62. The second flexible material 50 may be attached to the second wristlet 14 at a third location 64 and the second flexible material 50 may be attached to the second handle 18 at a fourth location 66. The third location 64 may be spaced a distance apart from the fourth location 66. The tightening member 24 is located in between the first location 60 and the second location 62. The tightening member 24 is also located in between the third location 64 and the fourth location 66.

It will be understood that the above attachments are not limited to any particular kind of attachments and each one may include permanent or releasable attachments. For example, in some embodiments, the first and second flexible materials 40, 50 may be threadingly attached to the first and second wristlets 12, 14 and the first and second handles 16, 18. In some embodiments, the attachments may include a carabiner, spring link, or other eyelet-type attachment, such as attachment member 120 for removably attaching the first and second flexible materials 40, 50 to the first and second wristlets 12, 14. Additionally, in some embodiments, the first and second flexible materials 40, 50 may be permanently attached to the first and second wristlets 12, 14 and the first and second handles 16, 18 in a variety of ways including, but not limited to rings or links each defining an opening through which the first and second flexible material 40, 50 and an eyelet of the first and second wristlets 12, 14 pass.

Figure 3A:
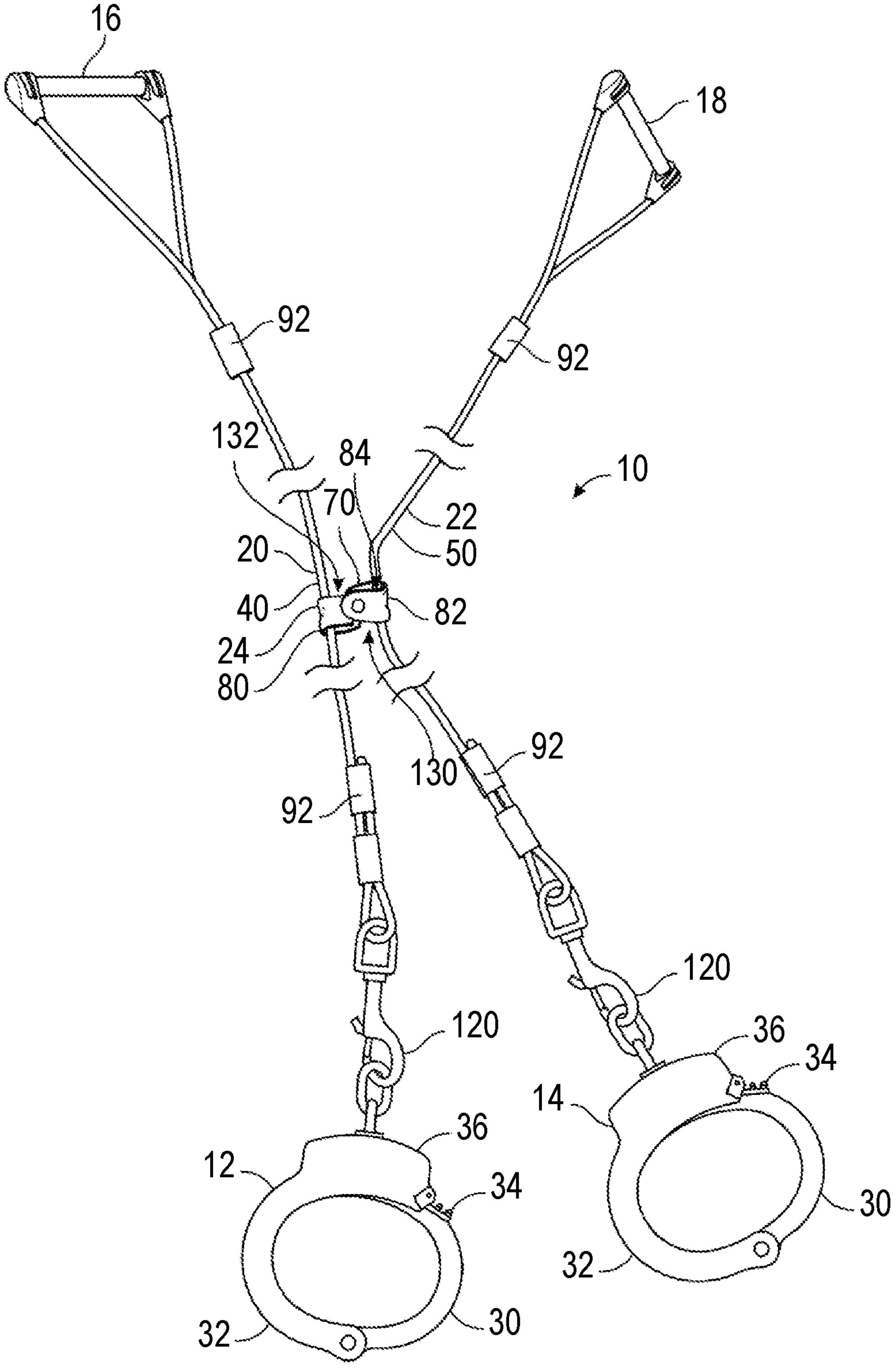
FIG. 3A is a perspective view of one embodiment of the apparatus of FIG. 1.
Figure 3B:
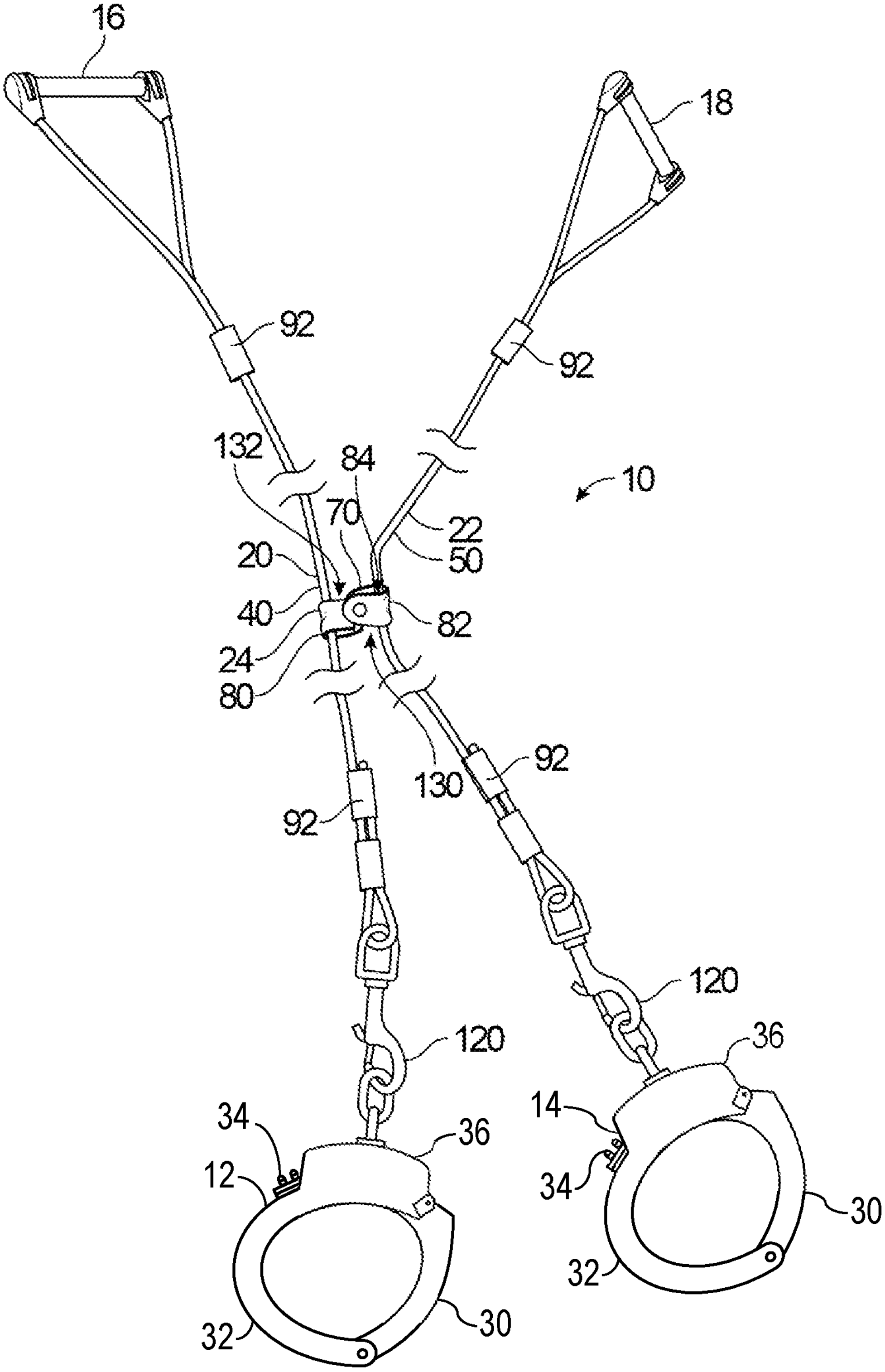
FIG. 3B is a perspective view of another embodiment of the apparatus of FIG. 1.
Figure 4:
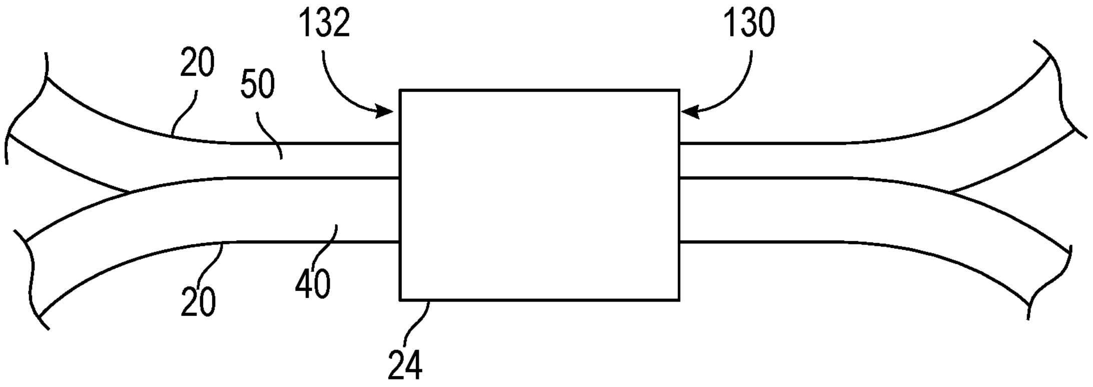
FIG. 4 is a side view of one embodiment of the tightening member of the inventive concepts disclosed herein.
Figure 5:
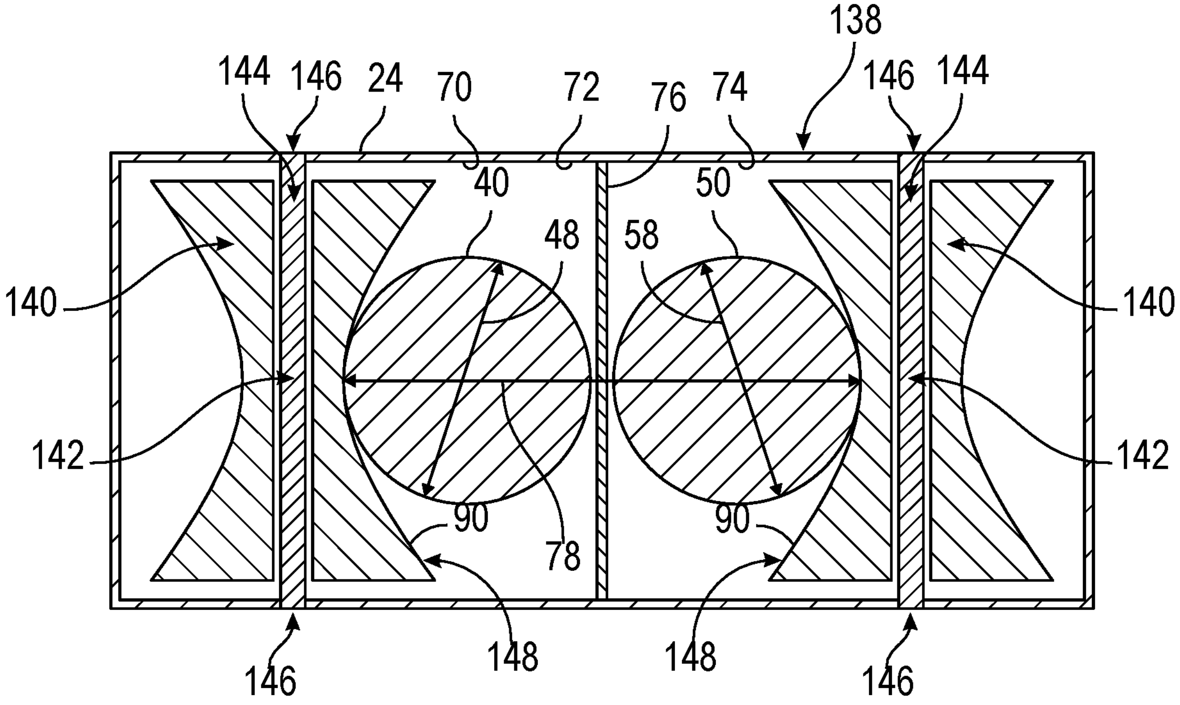
FIG. 5 is a sectional view of another embodiment of the tightening member of the inventive concepts disclosed herein.

Referring now to FIGS. 3-5, in one embodiment, the apparatus 10 includes the at least one tightening member 24 defining at least one channel 70. In one embodiment, the first line 20 and the second line 22 pass through the at least one channel 70 so as to bring the first line 20 and the second line 22 at least partially adjacent one another. The at least one tightening member 24 serves to bring portions of the first line 20 and the second line 22 together within the at least one tightening member 24. The at least one tightening member 24 is also movably attached to the first line 20 and the second line 22. For example, the at least one tightening member 24 may be slidably or rollingly attached to the first line 20 and the second line 22 so as to allow the at least one tightening member 24 to move with low resistance along the first length 47 and the second length 57. The tightening member 24 is provided with a first side 130 and a second side 132. In some embodiments, the tightening member 24 is a band surrounding the channel 70. The band can be constructed of a resilient and abrasive resistant material, such as a hardened steel (i.e., a medium or high carbon steel that has been given heat treatment and then quenching followed by tempering), or a ceramic coated steel.

It will be understood that the inventive concepts disclosed herein are not limited to the number of tightening members or the number of channels. As shown in FIG. 5, in one embodiment, one tightening member 24 defines a first channel 72 and a second channel 74 with a barrier 76 between the first channel 72 and the second channel 74. The barrier 76 may prevent the first flexible material 40 and the second flexible material 50 from coming into contact. However, it will be understood that in some embodiments the first flexible material 40 and the second flexible material 50 are in contact as shown in the embodiment of FIG. 4.

In the embodiment of FIGS. 1-3, the apparatus 10 may include a first tightening member 80 attached to a second tightening member 82. The first tightening member 80 and the second tightening member 82 each define at least one channel 84 (shown in FIGS. 1 and 2). The first tightening member 80 and the second tightening member 82 may each be in the form of a band. In one embodiment, the first tightening member 80 and the second tightening member 82 are releasably or permanently attachable so as to cause the first line 20 and the second line 22 to be at least partially adjacent one another. Of course, other embodiments exist wherein a number of tightening members defining a number of channels through which a number of lines pass are permanently or releasably attachable so as to cause the number of lines to be at least partially adjacent to one another.

Further, the channels 70, 72, 74, 84 may have at least one third cross-sectional dimension 78. The at least one third cross-sectional dimension 78 may be greater than the first cross-sectional dimension 48 and the second cross-sectional dimension 58 such that the first line 20 and the second line 22 are movable along the first length 47 and the second length 57 within the at least one channel 70, 72, 74, 84. For example, in some embodiments, the at least one third cross-sectional dimension 78 is between ½ square inch and fifteen square inches.

It will be understood that the at least one third cross-sectional dimension 78 may be configured in a variety of shapes and sizes and the disclosed invention is not limited to a particular configuration so long as the at least one third cross-sectional dimension 78 allows for the first line 20 and the second line 22 to be movable along the first length 47 and the second length 57.

In one embodiment, the at least one tightening member 24 may further include at least one pulley 90 (FIG. 5 and FIG. 6) so as to facilitate the movement of the at least one tightening member 24 relative to the first handle 16 and the second handle 18. The pulley 90 includes a housing 138, a pulley wheel 140 having an internal bore 142, and a shaft 144 passing through the internal bore 142. Ends 146 of the shaft 144 are connected to the housing 138. The pulley wheel 140 is positioned within the housing 138 and is rotatable on the shaft 144. The pulley wheel 140 is provided with an outer surface 148. The first flexible material 40 and the second flexible material 50 pass through the housing 138 and ride on the outer surface 148 of the pulley wheel 140. The outer surface 148 can be provided with a concave shape, as shown in FIG. 5.

In one embodiment, the at least one tightening member 24 may include at least one ratcheting system (not shown) and/or at least one form of locking mechanism (not shown) so as to prevent the first flexible material 40 and/or the second flexible material 50 from moving in at least one direction through at least one of the first channel 72 and the second channel 74, or the channel(s) 84.

As shown in FIGS. 3A-3B, in one embodiment, at least one of the first line 20 and the second line 22 may include at least one stopping member 92. The at least one stopping member 92 may be positioned on and extend from the first line 20 or the second line 22. The stopping member 92 is sized so as to be larger than the channel(s) within the tightening member 24 so as to prevent further displacement of the at least one tightening member 24 relative to the first line 20 or the second line 22. FIG. 3A shows an example of the apparatus 10 including oversize wristlets 12 and 14; and FIG. 3B shows an example of the apparatus 10 including regular size wristlets 12 and 14. As can be seen in FIGS. 3A and 3B, the ratchet bar 30 of the oversize wristlets 12 and 14 (shown in FIG. 3A) has a larger radius to more easily surround larger wrists as compared to the ratchet bar 30 of the regular size wristlets 12 and 14 (shown in FIG. 3B).

In one embodiment, as illustrated in FIGS. 1 and 2, displacing the first handle 16 away from the second handle 18, causes the tightening member 24 to move towards the first wristlet 12 and the second wristlet 14 thereby moving the first wristlet 12 closer to the second wristlet 14 Conversely, increasing the distance between the first wristlet 12 and the second wristlet 14 causes the tightening member 24 to move towards the first handle 16 and the second handle 18 thereby reducing a distance between the first handle 16 and the second handle 18. In one embodiment, contact between the at least one tightening member 24 and the at least one stopping member 92 may prevent the first wristlet 12 and the second wristlet 14 from getting closer than a minimum distance from one another and also prevents the first handle 16 from moving further away from the second handle 18. Similarly, contact between the at least one tightening member 24 and the at least one stopping member 92 may prevent the first handle 16 and the second handle 18 from getting closer than a minimum distance from one another.

Figure 6:
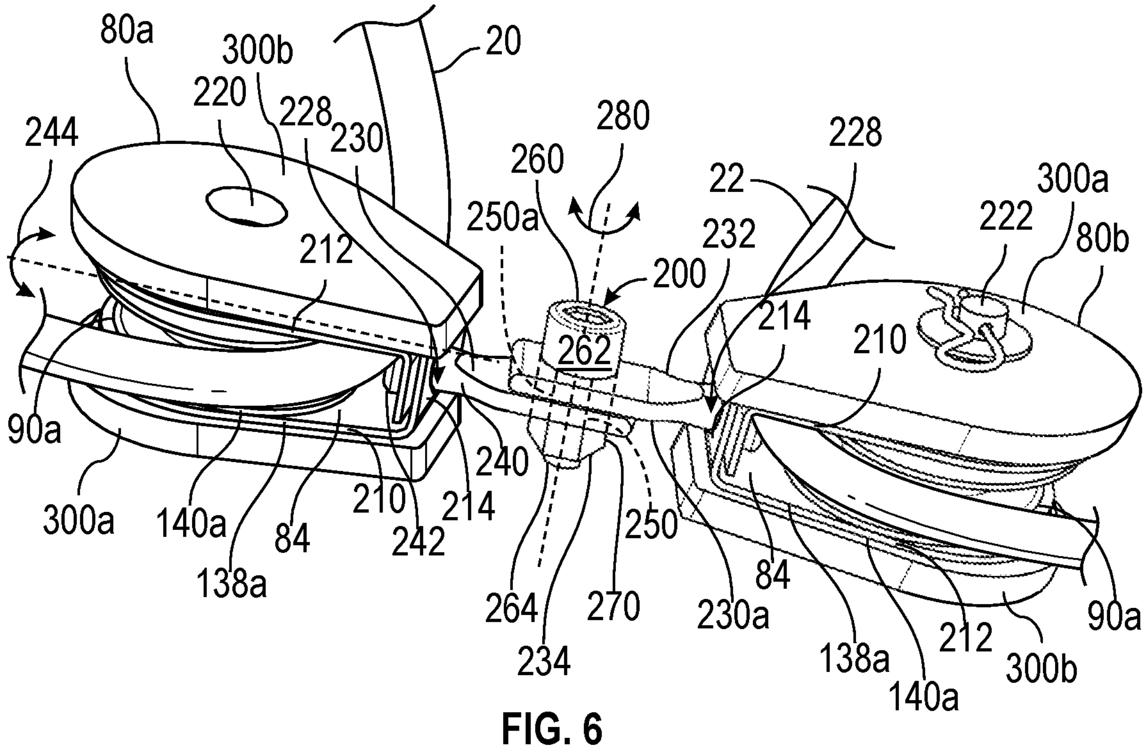
FIG. 6 is a partial perspective view of another embodiment of the apparatus constructed in accordance with the present invention having a first tightening member and a second tightening member connected together with a multi-axis movement assembly to prevent the first and second lines guided by the first tightening member and the second tightening member from binding.

FIG. 6 is a partial perspective view of another embodiment of the apparatus 10 constructed in accordance with the present disclosure having a first tightening member 80*a* and a second tightening member 80*b* connected together with a multi-axis movement assembly 200 to prevent the first and second lines 20 and 22 guided by the first tightening member 80*a* and the second tightening member 80*b* from binding. The first tightening member 80*a* and the second tightening member 80*b* each define at least one channel 84.

The first tightening member 80*a* and the second tightening member 80*b* are similar in construction and function. For this reason, only the first tightening member 80*a* will be described hereinafter. Elements discussed below will be numbered on both the first tightening member 80*a* and the second tightening member 80*b*. The first tightening member 80*a* includes at least one pulley 90*a* (FIG. 6) so as to facilitate movement of the tightening member 80*a* relative to the first handle 16. The pulley 90*a* is similar in construction as the pulley 90, except as described below. The pulley 90*a* includes a housing 138*a* having a C-shape and a pulley wheel 140*a* positioned within the housing 138*a*. The housing 138*a* is provided with a first sidewall 210, a second sidewall 212, and an end wall 214. The end wall 214 is connected to the first sidewall 210 and the second sidewall 212. The end wall 214 maintains the first sidewall 210 and the second sidewall 214 in a spaced apart configuration to form a space configured to receive the pulley wheel 140*a*. The end wall 214, the first sidewall 210 and the second sidewall 212 can be constructed of a single piece of material that is bent and/or otherwise formed into the shape shown in FIG. 6. The pulley wheel 140*a* is similar in construction and function as the pulley wheel 140 and has an internal bore (not shown) that is similar to the internal bore 142 shown in FIG. 5. The first sidewall 210 and the second sidewall 212 include openings 220 that are aligned with the internal bore of the pulley wheel 140*a*. The pulley 90*a* also includes a shaft 222, similar to the shaft 144, passing through the openings 220 in the first sidewall 210 and the second sidewall 212 and the internal bore 142 for securing the pulley wheel 140*a* within the housing 138*a*. The pulley wheel 140*a* is rotatable on the shaft 222.

The end wall 214 includes an aperture 228 configured to receive a part of the multi-axis movement assembly 200 as will be described in more detail below. The multi-axis movement assembly 200 includes a first rod 230, a second rod 232, and an attachment assembly 234 movably connecting the first rod 230 and the second rod 232. In the embodiment shown in FIG. 6, The first rod 230 has a shaft 240 passing through the aperture 228 in the end wall 214. The first rod 230 may also be provided with a flange 242 extending outwardly from the shaft 240 to prevent the first rod 230 from being removed from the aperture 228. In some embodiments, the first rod 230 is pivotally connected to the end wall 214 as shown by arrows 244. The second rod 232 may be constructed in a similar manner as the first rod 230.

The shaft 240 of the first rod 230 has a first opening 250 within boundaries of the first rod 230, and a shaft 230*a* of the second rod 232 has a second opening 250*a* within boundaries of the second rod 232. The shafts 230 and 230*a* overlap, and the first opening 250 is aligned with the second opening 250*a*. The attachment assembly 234 includes a third rod 260 extending through the first opening 250 and the second opening 250*a* to connect the first rod 230 to the second rod 232. In some embodiments, the third rod 260 may be in the form of a bolt or pin having a head 262 and a shaft 264. To maintain the third rod 260 in the first opening 250 and the second opening 250*a*, a fastener 270, such as a cotter pin or a lock nut can be attached to the shaft 264. For example, when the shaft 264 is a threaded shaft, the lock nut can be threaded onto the shaft 264 so as to clamp the first rod 230 to the second rod 232 together. The lock nut and a length of the threaded shaft 264 are preferably configured to avoid clamping the first rod 230 and the second rod 232 with sufficient force to prevent the first rod 230 from moving relative to the second rod 232. Rather, the lock nut and a length of the threaded shaft are preferably configured to permit the first rod 230 to pivot relative to the second rod 232 when the lock nut is tightened onto the threaded shaft 264 as shown by arrows 280 depicted in FIG. 6.

The head 262 has a cross-sectional dimension greater than the first opening 250 and the second opening 250*a* such that the head 262 overlaps the first rod 230 and the second rod 232 to prevent the head 262 from passing through the first opening 250 and the second opening 250*a*. The shaft 264, on the other hand, has a cross-sectional dimension less than the first opening 250 and the second opening 250*a* so that the shaft 264 may pass through the first opening 250 and the second opening 250*a*.

To protect the officers and the individual to be restrained from being harmed, the first tightening member 80*a* may be provided with a first pad 300*a* and a second pad 300*b*. The second tightening member 80*b* may be constructed similarly as the first tightening member.

The first pad 300*a* is positioned on the first sidewall 210, opposite of the pulley wheel 140*a*, and extends beyond a perimeter of the first sidewall 210. The second pad 300*b* is positioned on the second sidewall 212, opposite of the pulley wheel 140*a*, and extends beyond a perimeter of the second sidewall 212 to shield the officers and the individual to be restrained from impact with the first sidewall 210 and the second sidewall 212. The first and second pads 300*a* and 300*b* can be constructed of a resilient material, such as rubber.

In use, the apparatus 10 operates to help at least two individuals restrain at least one individual(s). For example, the apparatus 10 may be used by two or more law enforcement officers to restrain an individual(s). In one method, at least one law enforcement officer may obtain an apparatus 10 in accordance with the inventive concepts disclosed herein, position the first wristlet 12 on one of the individual's 100 wrists, position the second wristlet 14 on the other one of the individual's 100 wrists. If more officers are available, then one officer can position the first wristlet 12 on one of the individual's 100 wrists, and another officer can position the second wristlet 14 on the other one of the individual's 100 wrists. Then, the first handle 16 is gripped by a first officer and the second handle 18 is gripped by a second officer. The first and/or second officers may be different from the officers that positioned the first and second wristlets 12, 14 on the individual 100. The first and second officers move the first and second handles 16 and 18 away from each other, which causes the first wristlet 12 and the second wristlet 14 (and the individual's 100 wrists) to move together. Then, a third officer applies a separate pair of handcuffs on the individual's 100 wrists thereby restraining the individual(s) 100 as the first and second officers holding onto the first handle 16 and the second handle 18 maintain control over the individual(s) 100. In other words, once the first and second wristlets 12 and 14 are connected to the individual's 100 wrists, the first and second officer can maintain control over the individual(s) 100 by moving the first handle 16 and the second handle 18 apart. After the separate pair of handcuffs has been applied to the individual's 100 wrists, then the first wristlet 12 and the second wristlet 14 can be removed from the individual's 100 wrists.

Some instances of use may include a plurality of law enforcement officers placing wristlets 12, 14 on the individual(s) 100 to be restrained, each of the plurality of law enforcement officers gripping the first handle 16 or the second handle 18 and moving the first handle 16 and the second handle 18 apart with respect to the at least one tightening member 24 causing the first wristlet 12 and the second wristlet 14 to come closer together. Such use may be intended to restrain the hands or arms of the individual(s) 100 and thereby obtain the goal of officer(s) to have the individual(s) 100 restrained and in a position to then safely apply a pair of handcuffs and have the individual(s) 10 successfully handcuffed for the balance of the arrest process. At the point officer(s) apply the pair of handcuffs to the individual's wrists, after the individual(s) 100 is restrained and positioned by the apparatus 10 for same, the apparatus 10 can be fully removed from the individual's person for storage and be available for the next application where the apparatus 10 is needed in any situation so arising.

In one embodiment, an apparatus in accordance with the inventive concepts disclosed herein is constructed by attaching the first wristlet 12 to a first section of the first line 20 and the second wristlet 14 to a second section of the second line 22. The first line 20 and the second line 22 are constructed of a flexible material. The first line 20 and the second line 22 are passed through at least one channel 70, 72, 74, or 84 of the tightening member 24 having the first side 130 and the second side 132. In some embodiments, the at least one tightening member includes the first tightening member 80*a* and the second tightening member 80*b*. In these embodiments, passing is defined further as passing the first line 20 through the channel 90*a* of the first tightening member 80*a*, and passing the second line 22 through the channel 90*a* of the second tightening member 80*b*. In these embodiments, the method may also include the step of connecting the first tightening member 80*a* to the second tightening member 80*b*. This can be accomplished by connecting the first tightening member 80*a* to the second tightening member 80*b* using the multi-axis movement assembly 200. For example, the first rod 230 can be connected to the first tightening member 80*a* by passing the first rod 230 through the aperture 228 in the end wall 214 and securing the first rod 230 to the end wall 214 by the flange 242. The second rod 232 can be connected to the second tightening member 80*b* in a similar manner. Then, the first rod 230 and the second rod 232 can be connected together by positioning the first rod 230 and the second rod 232 in an overlapping position such that the first opening 250 and the second opening 250*a* are aligned, and then passing the third rod 260 through the first opening 250 and the second opening 250*a*. The third rod 260 can be secured in the first opening 250 and the second opening 250*a* by placing the fastener 270 on or through the third rod 260.

The first handle 16 is attached to a third section of the first line 20 and the second handle 18 is attached to a fourth section of the second line 22. The first section and the second section are positioned on the first side 130 of the tightening member 24, and the third section and the fourth section are positioned on the second side 132 of the tightening member 24. These steps can be performed in any order. For example, the first wristlet 12 can be attached to the first line 20 before or after the second wristlet 14 is attached to the second line 22. Further, the first wristlet 12 can be attached to the first line 20 before or after the first line 20 is passed through the channel 70 or 72. Likewise, the first wristlet 12 can be attached to the first line 20 before or after the first handle 16 is attached to the first line 20. And, the first line 20 and the second line 20 can be passed through the channel(s) 70, 72, 74, 84 prior to attachment of the first wristlet 12 and the first handle 16 is attached to the first line 20, or the second wristlet 14 and the second handle is attached to the second line 22.

From the above description, it is clear that the inventive concepts disclosed herein are well adapted to carry out the objects and to attain the advantages mentioned herein as well as those inherent in the inventive concepts disclosed herein. While exemplary embodiments of the inventive concepts disclosed herein have been described for purposes of this disclosure, it will be understood that numerous changes may be made which will readily suggest themselves to those skilled in the art and which are accomplished within the scope of the inventive concepts disclosed and as defined in the appended claims.

What is claimed is:

1. An A restraint apparatus, comprising:

a first wristlet positionable about a first body part;

a second wristlet positionable about a second body part;

a first handle;

a second handle;

a first line constructed of a first flexible material, the first flexible material having a first end, a second end, a first width, and a first length, the first flexible material having a first cross-sectional dimension extending across the first width, the first length extending between the first end and the second end, the first flexible material attached to the first wristlet at a first location and the first flexible material attached to the first handle at a second location, the first location being spaced a distance apart from the second location;

a second line constructed of a second flexible material, the second flexible material having a third end, a fourth end, a second width, and a second length, the second flexible material having a second cross-sectional dimension extending across the second width, the second length extending between the third end and the fourth end, the second flexible material attached to the second wristlet at a third location and the second flexible material attached to the second handle at a fourth location, the third location being spaced a distance apart from the fourth location;

at least one tightening member defining at least one channel, the first line and the second line passing through the at least one channel, the at least one channel having at least one third cross-sectional dimension greater than the first cross-sectional dimension and the second cross-sectional dimension such that the first line and the second line are movable bi-directionally along the first length and the second length within the at least one channel; and wherein the tightening member, the first line and the second line are configured such that displacing at least one of the first handle and the second handle away from each other causes first movement of the tightening member towards the first wristlet and the second wristlet and varies a distance between the first wristlet and the second wristlet; and wherein displacing at least one of the first wristlet and the second wristlet away from each other causes second movement of the tightening member towards the first handle and the second handle and varies a distance between the first handle and the second handle.

2. The restraint apparatus of claim 1, wherein the at least one tightening member is slidably disposed about at least one of the first line and the second line.

3. The restraint apparatus of claim 1, wherein displacing at least one of the first handle and the second handle away from the at least one tightening member causes the distance between the first wristlet and the second wristlet to decrease.

4. The restraint apparatus of claim 1, wherein the at least one tightening member includes a first tightening member defining a first channel, and a second tightening member defining a second channel, the first line disposed in the first channel, and the second line disposed in the second channel.

5. The restraint apparatus of claim 4, wherein the first tightening member and the second tightening member are releasably connected.

6. The restraint apparatus of claim 1, wherein the at least one tightening member includes a first tightening member and a second tightening member, and further comprising a multi-axis movement assembly connecting the first tightening member to the second tightening member.

7. The restraint apparatus of claim 6, wherein the multi-axis movement assembly includes a first rod and a second rod, the first rod being pivotally connected to the second rod, the first rod pivotally connected to the first tightening member and the second rod pivotally connected to the second tightening member.

8. A restraint apparatus, comprising:

a plurality of wristlets positionable about a plurality of body parts, each of the plurality of wristlets positioned a first distance from one another;

a plurality of handles;

a plurality of lines, each of the plurality of lines having a first end and a second end, the first end attachable to at least one of the plurality of wristlets, the second end attachable to at least one of the plurality of handles;

at least one tightening member movably and rollingly attached to the plurality of lines; and wherein displacing at least one of the plurality of handles with respect to another one of the handles causes movement of the at least one tightening member and at least one of the plurality of wristlets to be positioned a second distance from at least one other wristlet of the plurality of wristlets.

9. The restraint apparatus of claim 8, wherein the at least one tightening member, further comprising a first tightening member and a second tightening member; and wherein the restraint apparatus further comprises a multi-axis movement assembly connecting the first tightening member to the second tightening member.

10. A method of making a restraint apparatus, comprising: in any order:

attaching a first wristlet to a first section of a first line and a second wristlet to a second section of a second line, the first line and the second line constructed of a flexible material;

passing the first line and the second line through at least one channel of at least one tightening member having a first side and a second side; and attaching a first handle to a third section of the first line and a second handle to a fourth section of the second line; and wherein the first section and the second section are positioned on the first side of the at least one tightening member, and the third section and the fourth section are positioned on the second side of the at least one tightening member; and wherein the tightening member is operable to move bi-directionally on at least one of the first line and the second line to vary a distance between the first wristlet and the second wristlet upon displacing at least one of the first handle and the second handle with respect to the at least one tightening member.

11. The method of claim 10, wherein the at least one tightening member includes a first tightening member and a second tightening member, and wherein passing is defined further as passing the first line through a channel of the first tightening member, and passing the second line through a channel of the second tightening member.

12. The method of claim 11, further comprising the step of connecting the first tightening member to the second tightening member.

* * * * *